(12) United States Patent
Menon et al.

(10) Patent No.: US 10,824,142 B2
(45) Date of Patent: Nov. 3, 2020

(54) AUTONOMOUS ROBOT WITH ON DEMAND TELEOPERATION

(71) Applicant: Dexterity, Inc., Palo Alto, CA (US)

(72) Inventors: Samir Menon, Palo Alto, CA (US); Zhouwen Sun, Redwood City, CA (US); Gerald Brantner, Los Altos, CA (US)

(73) Assignee: Dexterity, Inc., Redwood City, CA (US)

( * ) Notice: Subject to any disclaimer, the term of this patent is extended or adjusted under 35 U.S.C. 154(b) by 303 days.

(21) Appl. No.: 15/968,492

(22) Filed: May 1, 2018

(65) Prior Publication Data

US 2019/0339693 A1 Nov. 7, 2019

(51) Int. Cl.
*G05D 1/00* (2006.01)
*B25J 9/16* (2006.01)

(52) U.S. Cl.
CPC .......... *G05D 1/0061* (2013.01); *B25J 9/1689* (2013.01); *G05D 1/0027* (2013.01); *G05D 1/0088* (2013.01); *G05D 2201/0216* (2013.01)

(58) Field of Classification Search
CPC ..................................... G05D 1/00; B25J 9/16
See application file for complete search history.

(56) References Cited

U.S. PATENT DOCUMENTS

| | | | |
|---|---|---|---|
| 9,665,095 B1 | 5/2017 | Romano et al. | |
| 9,880,553 B1 * | 1/2018 | Hoffmann | G05D 1/0038 |
| 10,124,489 B2 | 11/2018 | Chitta | |
| 2012/0061155 A1 * | 3/2012 | Berger | B25J 5/007 |
| | | | 180/21 |
| 2014/0163730 A1 * | 6/2014 | Mian | B25J 9/16 |
| | | | 700/248 |
| 2014/0277692 A1 | 9/2014 | Buzan et al. | |
| 2016/0304280 A1 | 10/2016 | Elazary et al. | |
| 2017/0158430 A1 | 6/2017 | Raizer | |
| 2017/0217021 A1 | 8/2017 | Hoffman | |

* cited by examiner

*Primary Examiner* — Kira Nguyen
(74) *Attorney, Agent, or Firm* — Van Pelt, Yi & James LLP

(57) ABSTRACT

An autonomous robot with on demand human intervention is disclosed. In various embodiments, a robot operates in an autonomous mode of operation in which the robot performs one or more tasks autonomously without human intervention. The robot determines that a strategy is not available to perform a next task autonomously. In response to the determination, the robot enters a human intervention mode of operation.

19 Claims, 10 Drawing Sheets

AUTONOMOUS ROBOT WITH ON DEMAND TELEOPERATION

BACKGROUND OF THE INVENTION

Robots have been used to perform tasks in manufacturing and other fields. For example, robots have been used to perform tasks in environments that may be unhealthy or otherwise dangerous to humans, tasks that require the application of force greater than a human may be able to apply, and tasks that require a high degree of precision and consistency over time.

Autonomous robots perform at least some tasks in an automated manner, without requiring human control or direction. For example, automated robots have been used to perform repetitive and/or otherwise predetermined tasks and sequences of tasks, typically in a controlled environment, such as a factory. More recently, self-driving cars, delivery drones, and other autonomous vehicles have been under development.

Teleoperation in the field of robotics refers to remote operation of a robot by an operator. For example, robots have been used to perform surgery, defuse bombs, and perform other tasks under the control of a skilled human operator.

BRIEF DESCRIPTION OF THE DRAWINGS

Various embodiments of the invention are disclosed in the following detailed description and the accompanying drawings.

DETAILED DESCRIPTION

Figure 1:
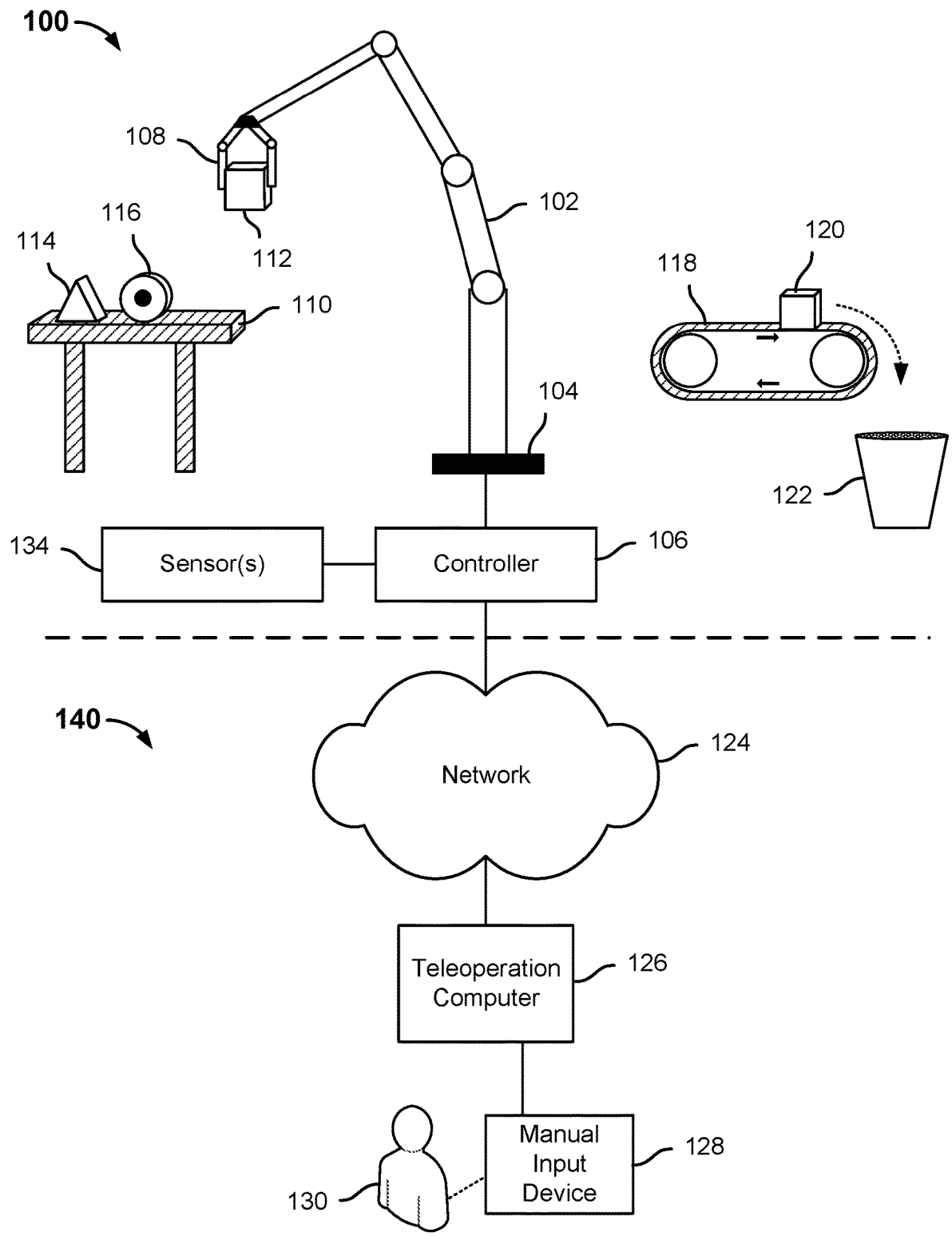
FIG. 1 is a block diagram illustrating an embodiment of an autonomous robot with on demand teleoperation.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An autonomous robot with on demand teleoperation is disclosed. In various embodiments, a robot as disclosed herein operates autonomously to perform a task or set of tasks for which the robot has skills and strategies to perform. In various embodiments, a task or set of tasks may be assigned to the robot by a human user or another robot or system. In some embodiments, the assigned task or set of tasks may be defined using one or more primitive commands, objectives, context information and variables, and/or other commands and data provided to the robot. The robot performs initialization processing, e.g., to orient itself relative to its environment and objects on which the robot will operate. In some embodiments, the robot makes a plan to perform the task or set of tasks assigned to and begins to implement the plan. If the robot reaches a state in which the robot cannot determine a next action to perform to advance towards completion of the task or set of tasks, the robot triggers intervention, e.g., by a human operator. In some embodiments, a human or other operator controls the robot, e.g., via teleoperation, to (further) perform the task or set of tasks and/or or restore the robot to a state in which the robot is able to resume autonomous operation.

In various embodiments, a robot as disclosed herein may include one or more physical elements usable to interact with a physical environment; one or more actuators to position and apply force using the physical elements; and one or more processors configured to control movement and application of force by the physical elements via control of the actuators. In various embodiments, the one or more processors may include one or more processors integrated into the robot and/or one or more processors comprising local and/or remote computers configured to control the robot, in autonomous operation, teleoperation, or both.

FIG. 1 is a block diagram illustrating an embodiment of an autonomous robot with on demand teleoperation. In the example shown, an autonomous robot operating in environment 100 includes a plurality of jointed segments comprising a robotic arm 102 mounted on a stationary base 104. The robotic arm 102 is coupled to a controller 106 configured to manipulate the robotic arm 102 and a gripper 108 mounted on a distal end of robotic arm 102. In some embodiments, controller 106 controls the robotic arm 102 and gripper 108 by providing voltages and/or other signals, inputs, etc. to motors configured at each of the respective joints between rigid elements comprising the robotic arm 102 and/or gripper 108 to cause the respective motors to apply corresponding torque(s) to cause an element coupled to a rotating element of the motor to move relative to an element to which a non-rotating element of the motor is coupled.

In the example shown in FIG. 1, the robotic arm 102 is being used to pick up items from a table or other surface 110, including in the example shown differently shaped items 112, 114, and 116, and place them on a conveyor belt 118. As shown, robotic arm 102 has previously been used to place item 120 on the conveyor belt 118, which is rotating in a direction such that the item 120 is about to fall off the conveyor belt 118 into a destination 122.

In various embodiments, the "pick and place" operation shown in FIG. 1 is performed by the robot comprising robotic arm 102, gripper 108, and controller 106, at least in part in an autonomous mode of operation. For example, in some embodiments the controller 106 and/or one or more other control devices, such as a computer comprising a processor, a memory, and other components, is/are programmed to perform the pick and place operation illustrated in FIG. 1. For example, in some embodiments a programmer or other operator may have programmed or otherwise configured the robot to have an awareness of its environment 100 and its position relative to the items on table 110 (or, in some embodiments, a set of coordinates or other locations associate with the table 110, on the one hand, and the conveyor belt 118.

In some embodiments, the robot is programmed or otherwise configured to use a library or other repository of strategies to perform the pick and place operation and/or portions thereof. For example, the robot may be configured to use awareness of its current position and the environment 100 to position gripper 108 at a location above table 110. Computer vision or other techniques may be used to identify and select an item to pick up next, and a strategy to pick up the item may be selected autonomously, e.g., based on one or more of the item's location, shape, orientation, aspect presented, texture, rigidity, etc. For example, in the example shown in FIG. 1, the robot may recognize the item 114 as presenting substantially parallel flat surfaces on the front and back sides, as shown, and may select as a strategy to pick up item 114 positioning the gripper 108 above item 114, rotating the gripper 108 to align its fingers to positions aligned with the front and rear surfaces of item 114, and grasping the item 114 with one finger engaging the front flat surface and the other engaging the back flat surface.

In various embodiments, the robot comprising robotic arm 102, gripper 108, and controller 106 automatically prompts intervention by teleoperation. In some embodiments, if in the course of performing the pick and place operation shown in FIG. 1 the robot reaches a state in which the robot cannot determine a (next) strategy to (further) perform the operation, the robots prompts a remote operator (in this example) to assist via teleoperation.

In the example shown, controller 106 is connected via network 124 to a teleoperation computer 126. In some embodiments, teleoperation computer 126 may be involved in operation of the robot in the autonomous mode, e.g., by communicating high level instructions to controller 106 via network 124. In various embodiments, one or both of the controller 106 and teleoperation computer 126 may prompt an intervention by teleoperation, e.g., if the robot reaches a state in which it does not have a strategy available to perform (complete) a next task or step in the operation.

For example, referring further to FIG. 1, if the item 114 were dropped and landed on one of its flat sides, in an orientation that presented a triangular aspect to the robot, in some embodiments the robot may not have a strategy available to pick up the item 114 and/or may have timed out or exhausted a configured number of attempts to pick up the item 114. In response, the teleoperator 130 may be prompted to intervene through teleoperation, and may use the manual input device 128 to control operation of the robot. For example, the teleoperator 130 may manipulate the robot to pick up the item 114 and place the item on the conveyor belt 118. Or, the teleoperator may use the robot to change the orientation of the item 114 to one in which the autonomous robot would be expected (or be more likely) to have a strategy available to pick up the item 114.

In the example shown, teleoperation may be performed through manipulation of a manual input device 128, e.g., a haptic input device, by a human operator 130. The human operator 130 (sometimes referred to as a teleoperator) may be prompted by information displayed via a display device comprising and/or associated with the teleoperation computer 126 to begin teleoperation. Data from one or more sensors 134 may be provided to the human operator 130 via network 124 and teleoperation computer 126. In some embodiments, sensors 134 include a camera on the robot or otherwise in the environment 100 configured to generate a video feed that is displayed to the teleoperator 130 and used to perform and/or complete performance of an operation or portion thereof via teleoperation. In various embodiments, the camera is connected with a low-latency, high throughput connection, including by way of example and without limitation one or more of analog RF based communication, WiFi, Bluetooth, and Sub GHz. In some embodiments, a mix of cameras of different types is used. For example, cameras with different communication rates, bandwidth, and/or other characteristics may be used, such as two RGB visual cameras, four depth cameras, two IR cameras, etc.

In various embodiments, teleoperation may be performed using a variety of different sensors 134. In some embodiments, these may guide the robot in determining whether it is "stuck", and/or may simplify the teleoperation. In some embodiments, sensors help transition the teleoperation modality from direct haptic controls to increasingly abstract executive commands (such as clicking an object to pick with a mouse, or saying "open shelf" to an audio transcription device).

Examples of sensors 134 used in various embodiments include digital switches that are configured to detect interactions and specific "stuck" scenarios with the environment, and/or the presence of unknown agents in the vicinity of the robot (or teleoperator). Further examples include force or pressure sensors on the hand or robot that determine success or failure of operations such as grasps. After some series of failures, the robot determines it is "stuck". Another example is one or more sensors, such as position sensors on the robot joints, that may be used by the robot to know whether the planned and/or otherwise expected movement trajectory is being followed precisely. When it is not following the expected trajectory precisely, likely it has made contact with the environment and the robot may be programmed to conclude it has gotten "stuck" and needs to invoke human intervention.

In various embodiments, the robot may pre-process information to make it easier for a human to provide teleoperation via high-level executive commands, such as open bin A or pick up item Y. Examples of pre-processing of information in various embodiments include but are not limited to:

1) The robot combines together a depth camera feed and a regular RGB camera feed to give better depth perception to the human operator.
   a) Either a "3d video game" like interface is given where the human can interact with the environment in 3D to better analyze and interpret the situation.
   b) Or a VR interface can be used for total immersion in the environment.
2) Scenes of the environment are not (necessarily) exposed entirely to the human
   a) sections of the environment that the robot deems important will be shown only instead to the human
3) If manipulating the gripper is done manually through haptic teleoperation and depth is not well perceived through a regular RGB camera feed to the operator:
   a) The gripper can change color (overlayed virtually in the gripper as displayed to the human operator) with respect to how close it is to making contact with the environment, giving the operator visual feedback about depth
   b) The gripper or other parts of the robot can change color (overlayed virtually) with respect to how much force the robot is applying to the environment, allowing contact/force to be well perceived without expensive equipment.
4) When the human operator is controlling the robot, how fast the robot will move is unknown to the human:
   a) The human can adjust/see a gauge that is displayed and set a speed
      i) This is tough for a human to guess how fast the robot can go
   b) The robot visualization can instead overlay a transparent ball around its hand that changes in size relative to the current speed setting. The size of the ball represents the max movement range for a given speed and shows how the speed setting affects real world movement.

In some embodiments, data from the robot is augmented with data from sensors 134, contextual information, and/or past-knowledge information. In some embodiments, the robot is configured to provide such additional to a human operator to convey the robot's situation to the human operator more fully, enabling the human operator to better and more quickly provide assistance via teleoperation. Examples include, without limitation:

1) The robot picks a couple autonomous strategies that might work and the human selects the best one.
   a) An on screen overlay of the different strategies over the environment captured by a camera can be shown to give the human a good understanding of what to pick.
2) Instead of showing a global view of the environment, the robot can ask specific questions to make the analysis easier for the human
   a) Picking objects
      i) Instead of showing a whole view of objects on a table/in a bin and asking the user to click on the centers of objects, we can provide autonomous estimates that the robot has chosen through a neural network or some other prediction algorithm.
      ii) The human simply selects whether the estimate is correct or not, on a per object or global basis, which is just a yes/no command and is far easier than pinpointing the center of an object.

3) Scenario: Pick-and-place from a box to a conveyor belt
   a) There are a set of eight unknown objects in the box. Different shapes sizes/colors, softness etc.
   b) The robot's job is to pick all objects one-by-one and put them on the belt
   c) The robot picks five out of the eight objects
   d) For the sixth object, the robot has a rough shape estimate. It grabs based on that shape estimate two times in a row (at different grasp points). Both grabs fail. It reasons that the object might be squishy or deformable.
   e) The robot doesn't know how to deal with squishy objects.
   f) It triggers a call for help saying it is stuck, and stating that the likely reason is that the object is squishy.
4). Scenario: Pick-and-place from a conveyor belt to a shelf
   a) A series of objects are coming down a conveyor belt.
   b) The robot has to pick them off the belt and place them on a shelf
   c) A database system has communicated to the robot, the type (shape, weight, barcode etc.) of the item it should expect
   d) The robot encounters an unknown object on the belt (a different weight but the same shape, for instance)
   e) Ordinarily when the robot encounters a different object, it places it in an "extras" bin.
   f) It looks and finds that the extras bin is missing (e.g., a vision-based search cannot find the visual shape/id of the extras bin).
   g) The robot doesn't know what to do with the new object. It triggers a call for help saying it has an unknown object and the extras bin is missing.

In some embodiments, in the on demand teleoperation mode, the autonomous robot continues to monitor the environment 100 and the state of the robot. In some embodiments, the autonomous robot is configured to recognize that the robot and/or environment have been restored to a condition in which the robot has a strategy available to continue the operation autonomously. In some embodiments, the autonomous robot may prompt the teleoperator 130 to discontinue teleoperation and allow or actively cause autonomous operation to resume. In some embodiments, upon recognizing the availability of a strategy to continue the operation in autonomous mode, the autonomous robot takes over control of the robot on its own initiative and the system ceases to respond to inputs provided by the teleoperator 130 via the manual input device 128, and the robot resume autonomous operation.

In some embodiments, the robot is configured to anticipate and preemptively avoid and/or schedule human assistance to resolve situations where it might otherwise get stuck. For example, assume the robot is tasked to pick up three items A, B, and C, and determines it can pick up A, may be able to pick up B, and cannot pick up C. In various embodiments, the robot implements a plan that anticipates the uncertainty over its ability to pick up B and its anticipated inability to pick up C. For example, in one approach, the robot will conclude it will need help with C and possibly B and schedules human assistance at the time it expects to need help, for example after it has had time to pick up A and make the configured number of attempts to pick up B. If when the time scheduled for human help the robot has picked up A and been successful in picking up B, the human is prompted to help with C. If the robot has not picked up B successfully by the time scheduled for human intervention, helped with B and C is requested, for example. In another approach, the robot may pre-emptively trigger a direct request for task-related information to the teleoperator. For example, the robot may ask the teleoperator to indicate how the robot should grasp item C, and in the meanwhile, it picks up A and B. If the human teleoperator provides a strategy by the time the robot gets down to picking up item C, then the robot's motion is seamless. Otherwise, the robot requests help picking up C.

Further examples of a robot configured to anticipatorily and/or preemptively obtain human assistance as disclosed herein include, without limitation:

A robot encounters an unexpected obstacle (human). In such a case, the robot stops or slows down and asks the human operator for help with avoiding/passing by the obstacle. In some embodiments, sensors for obstacle detection include RGB cameras, depth cameras, heat (IR) cameras, combined with software that performs the detection.

A robot is asked to retrieve a "glass cup" from a table, but its vision system does not see the cup. So it makes a very specific query "Tell me where the cup is on the table?" The human is presented with a set of (unlabeled but segmented) objects on the table through a visual interface. The human uses this visual interface to point the robot to the cup, e.g., via a mouse click on the corresponding image. Sensors for this purpose include RGB and depth cameras.

A robot is presented with four objects and instructed to perform an assembly task. The robot 'knows' how to assemble pairs of these objects but is unaware of the right order. The human is presented with the objects through a visual interface and asked to provide the correct sequence. Following this instruction, the robot proceeds with assembling the items autonomously.

A mobile robot is asked to fetch an orange from the fridge. Because the environment has been remodeled (fridge was moved) it cannot locate it. The human operator is asked to guide the robot to the fridge, which he does using a joystick or a haptic device with live visual feedback. The robot is equipped with ultra-sonic proximity sensors that help with maintaining a collision-free trajectory through narrow corridors. In case the human drives the robot towards a wall, the robot will correct the path to the degree necessary but keep the 'collision-free' input. Once the robot is in close proximity, looking at the fridge, it will autonomously detect it, say 'thanks human', and proceed autonomously with the fetching task.

A robot is asked to perform an insertion task. (peg-in-hole). Due to occlusions in the depth-camera feed, the robot cannot find the hole. The human is asked to help guide the robot's hand towards the goal. In general, this is a high-dimensional problem, requiring position and force feedback. However, the robot autonomously maintains a given normal-force towards the surface as well as orientation control. Guidance is only needed to move towards the hole linearly.

A robot picks a variety of objects from a moving conveyor belt. Upstream from the robot on the conveyor belt, a camera or other sensor detects objects before they reach the robot. The system uses this information to determine if the robot can autonomously handle the object. If not, a call for human teleoperation is issued to tell the robot how to handle such object, such as through a simulation of the robot and object interacting in a VR interface or a GUI to describe how to interact with the object. The human interaction is completed before the object gets to the robot and the robot uses the human guidance information to interact with the object, eliminating the latency of the human teleoperation.

In the example shown in FIG. 1, the teleoperation computer 126, manual input device 128, and teleoperator 130 are shown to be in a location 140 remote from the environment 100 in which the robot is operating. In various embodiments, the teleoperation-related assets (e.g., 126, 128, 130) may be located anywhere, including in a same (or nearby) physical location as the environment 100.

Figure 2:
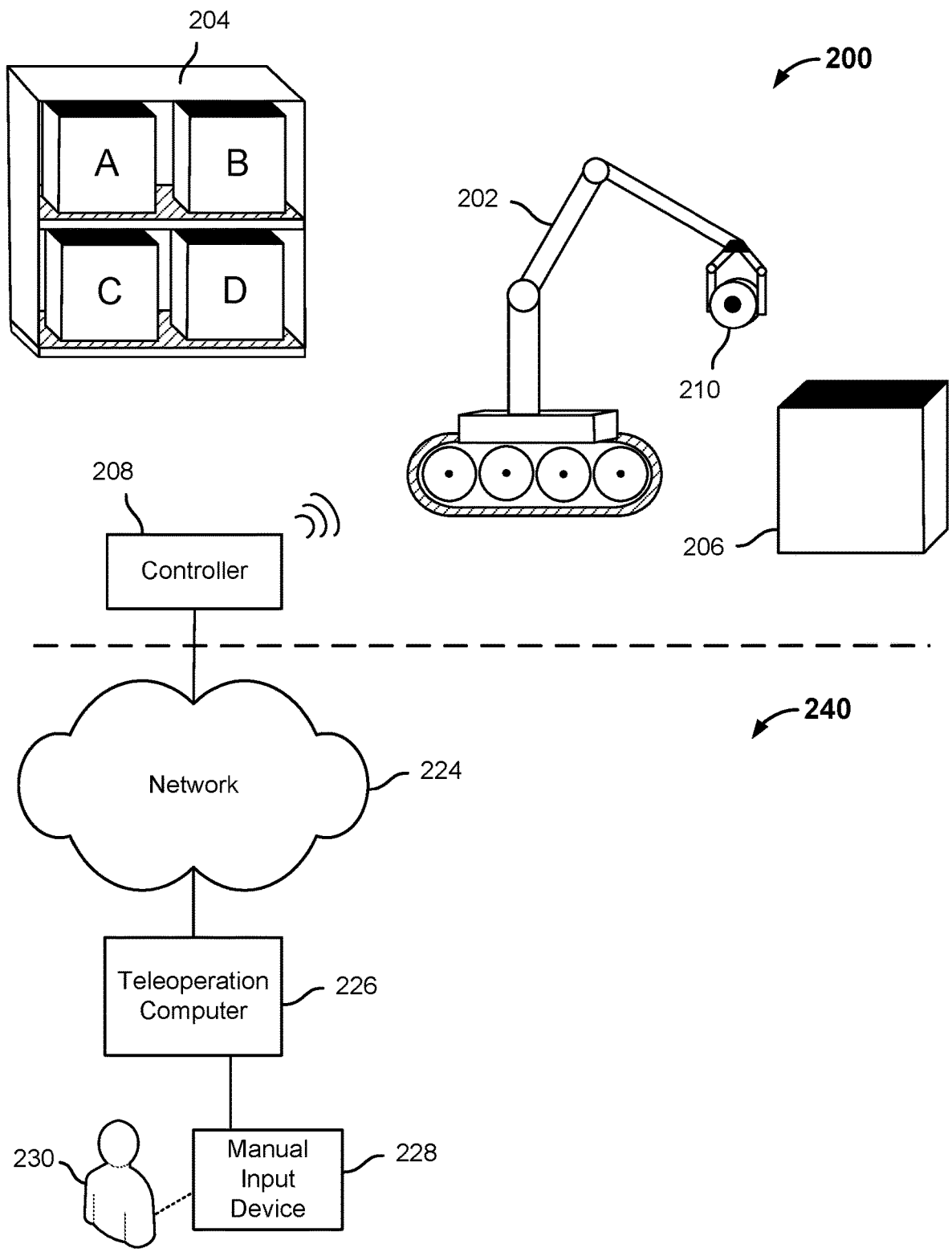
FIG. 2 is a block diagram illustrating an embodiment of an autonomous robot with on demand teleoperation.

FIG. 2 is a block diagram illustrating an embodiment of an autonomous robot with on demand teleoperation. In the example shown, robot 202 operates in environment 200 to performing a "kitting" operation, in which items are selected from the bins A, B, C, and D, as appropriate, on shelves 204 and added to box 206. In this example, robot 202 includes a robotic arm mounted on a tractor-style mobile base. The robot 202 is operated under control of controller 208 via wireless communication. In the state shown, the robot 202 has item 210 in the gripper at its distal end. For example, the robot 202 may have picked the item 210 from out of a corresponding one of the bins A, B, C, and D, e.g., by propelling itself to a position adjacent the bin, pulling the bin open, looking in to locate and identify the item 210 as a target to pick up, picking up the item 210, pushing the bin closed (e.g., with a portion of its robotic arm not holding the item 210), and propelling itself in the direction of a location adjacent to box 206, e.g., to be able to drop or place the item 210 into the box 206.

Similarly to the robot and environment shown in FIG. 1, the robot 202 in the example shown in FIG. 2 is configured to invoke on demand teleoperation, to be performed through communications via network 224 from a teleoperation computer 226, manual input device 228, and teleoperator 230 located in a remote location 240. For example, the robot 202 in some embodiments may have strategies to position itself near the bins on shelves 204, to open the bins, identify items to pick up, reach into the bin, grasp the item, propel itself to a position near the box, place the item in the box, close the bin, and repeat until done, for example. If at any point the robot reaches a state in which the robot does not have a strategy to proceed autonomously, in various embodiments the robot generates a request for on demand teleoperation. For example, in the example shown in FIG. 2, if a bin will not open, falls to the ground, gets jammed in a skewed or other unrecognized position, etc., or if a bin expected to contain an item is empty or has unrecognized items, or if the items are oriented such that the robot does not have a strategy to reach in and grasp a required item, etc., the robot in various embodiments will prompt the teleoperator 230 in this example to intervene.

The pick and place operation of FIG. 1 and the kitting operation of FIG. 2 are examples of the unlimited operations an autonomous robot with on demand teleoperation as disclosed herein may be used to perform.

Figure 3:
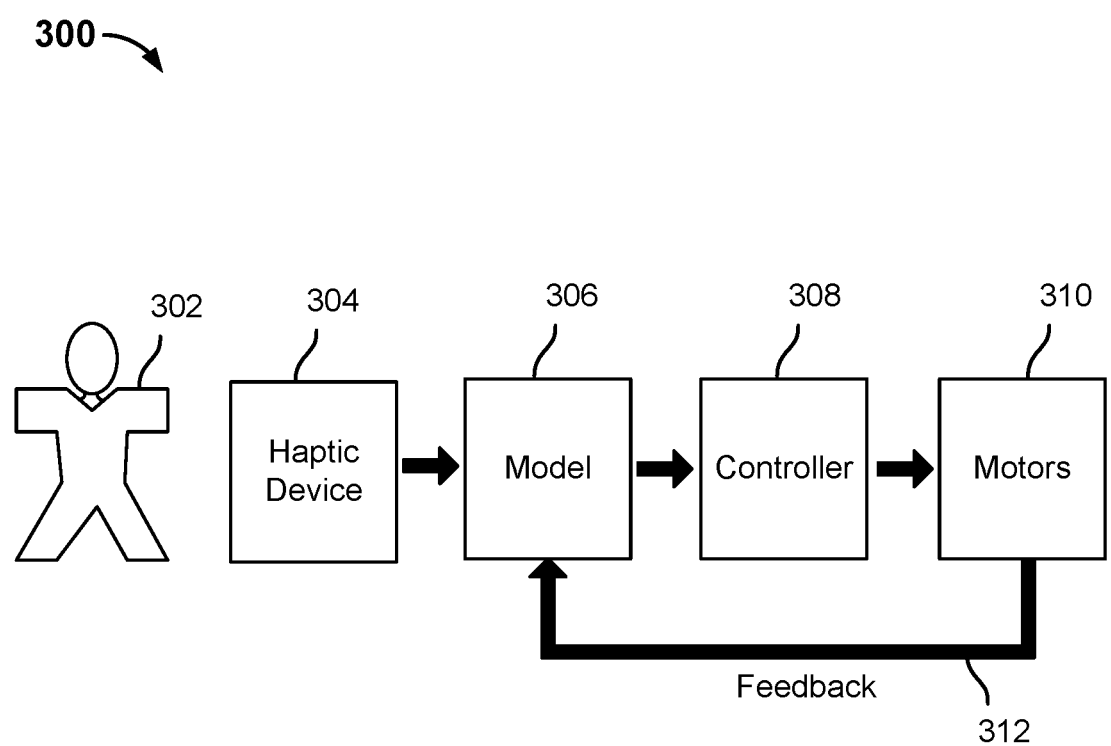
FIG. 3 is a block diagram illustrating an embodiment of a system to control via teleoperation an autonomous robot with on demand teleoperation.

FIG. 3 is a block diagram illustrating an embodiment of a system to control via teleoperation an autonomous robot with on demand teleoperation. In the example shown, the system 300 receives from a human teleoperator 302 input provided through manipulation of a manual input device, in this example haptic device 304. In some embodiments, haptic device 304 comprises a manually actuated input device that provides force feedback, such as the NOVINT FALCON haptic device provided by NOVINT TECHNOLOGIES. In various embodiments, one or more manual input devices other than and/or in addition to haptic device 304 may be used to perform teleoperation, including without limitation a tablet or other touch device, mouse, button/dial panel, phone, accelerometer wand, virtual reality pointing device, 3D magnetic mouse, interpreted hand gestures with a camera, etc.

In some embodiments, a user moves a handle, knob, grip, or other manual interface in three-dimensional space, and the haptic device 304 generates output signals representative of the movement of the input manual interface in three-dimensional space. In the example shown, outputs of the haptic device 304 are interpreted using a model 306 that describes the robot and its available behaviors. For example, the model 306 may reflect the physical dimension and configuration of the robot and its component parts, and may define solutions to move a controlled resource of the robot, such as the gripper 108 of FIG. 1 or the gripper of robot 202, in three-dimensional space within an environment in which the robot is operating, in response to input provided via the haptic device 304. For example, for a given current position of a robotic arm and its constituent parts, the model 306 may provide one or more solutions to control the robot's actuators (e.g., joint motors) to move the gripper from a current position to a destination position associated with the input received via the haptic device 304.

In the example shown, robot controller inputs generated based on the input provided via haptic device 304 as interpreted in light of the model 306 are provided to controller 308 to drive one or more motors 310 to move the robot gripper or other resource to the destination position. Feedback 312 is provide to one or both of model 306 and a computer associated with haptic device 304. In some embodiments, the feedback indicates a current position of the robot (e.g., a robotic arm) and the location and orientation of its constituent parts, to enable the model to be used to continue to drive the robotic arm gripper or other resource in response to input received via the haptic device 304.

In some embodiments, contextual information may be received and used to provide force feedback via the haptic device 304. For example, reaching or approaching a physical barrier of an environment in which the robot is operating; approaching a furthest extent of robotic arm reach; contacting a physical object in the environment, such as an object the robot has picked up; etc., may result in force feedback being provided to teleoperator 302 via haptic device 304.

In various embodiments, using a model such as model 306 to interpret and control operation of a robot based on inputs provided via a manual input device, such as haptic device 304, enables teleoperation to be performed in a much more intuitive and straightforward manner, and with more fluid, efficient, and continuous movement, as compared to alternatives such as controlling each joint individually.

Figure 4:
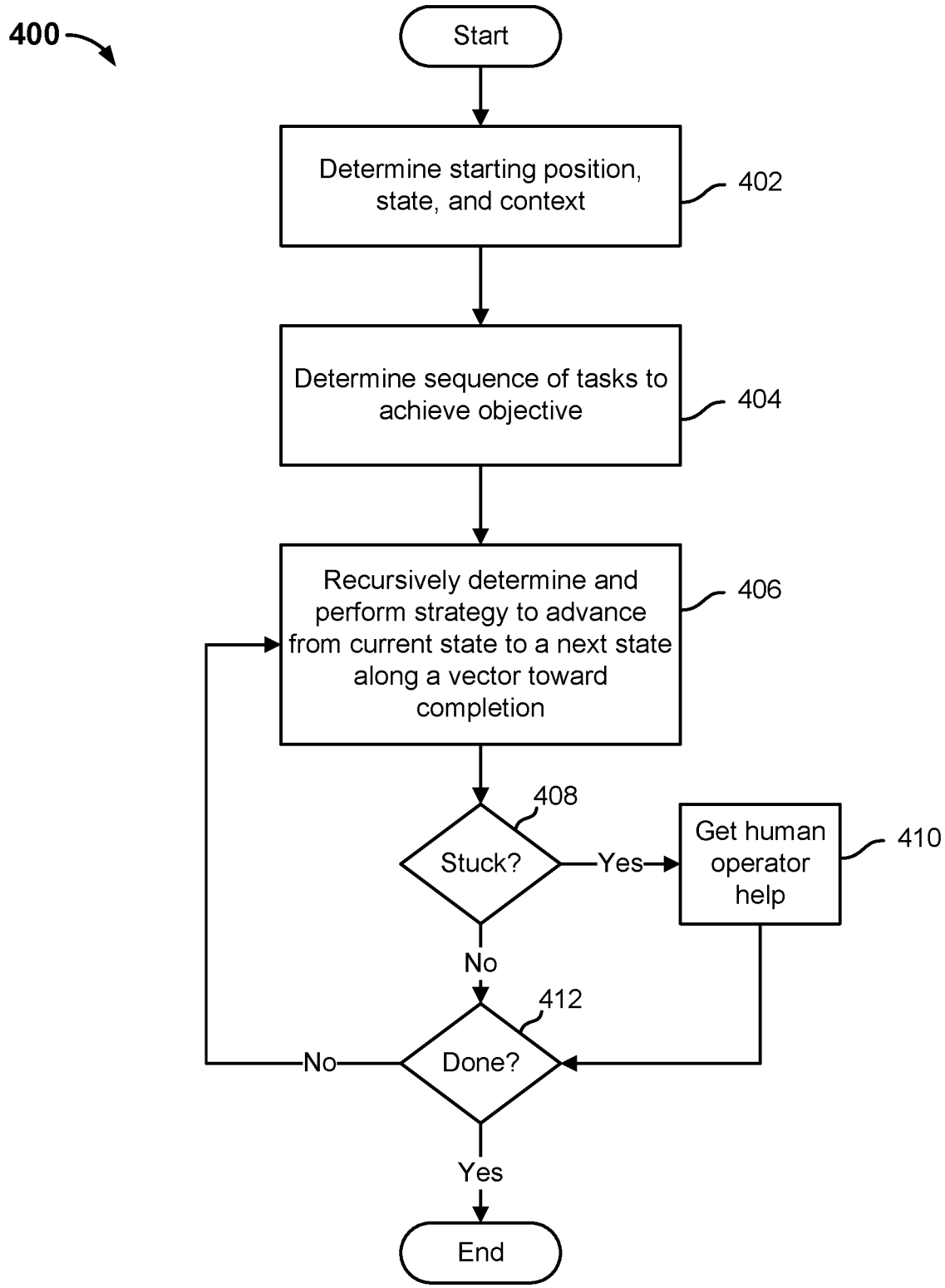
FIG. 4 is a flow chart illustrating an embodiment of process to control an autonomous robot with on demand teleoperation.

FIG. 4 is a flow chart illustrating an embodiment of process to control an autonomous robot with on demand teleoperation. In various embodiments, the process 400 of FIG. 4 is performed by one or more processor comprising and/or otherwise associated with an autonomous robot, to provide an autonomous robot with on demand teleoperation. In the example shown, upon receiving an instruction or other indication to perform an operation, the robot performing the process 400 determines at 402 its starting position, state, and context. For example, the robot may use GPS, manual input provided by an operator, etc. to determine its current location, along with the location and orientation of its constituent parts, such as segment and joints comprising its robotic arm, if applicable. Context determined at 402 may include the respective location of objects, containers, etc. the robot may be required to manipulate, destination locations (e.g., the conveyor belt 118 of FIG. 1, the box 206 of FIG. 2, etc.).

At 404, the robot determines a sequence of tasks to achieve the overall assignment and/or objective. For example, referring to FIG. 1, the assignment may be to pick items from table 110 and place them one by one on conveyor 118. Or, referring to FIG. 2, the assignment may be to file box 206 with one item from bin A and two items from bin D. In various embodiments, each task in the sequence (or other set) of tasks determined at 404 may include, explicitly or implicitly, use of one or more skills to perform one or more sub-tasks. For example, referring to FIG. 2, placing one item from bin A into box 206 may include driving to a position near bin A, pulling out bin A, looking in to find an instance of the item, determining a strategy to reach in and pick up the item, grabbing the item, pulling it out of bin A, etc.

At 406, the robot recursively determines and performs (or attempts to perform) a strategy to perform a next task or sub-task to advance from a current state to a next state along a vector toward completion of the overall assignment and/or a component thereof.

If the robot gets stuck (408), e.g., the robot cannot determine an available strategy to perform a next task or sub-task to move towards completion of the overall assignment, the robot requests and/or waits for intervention by teleoperation (410). Once the human operator has intervened via teleoperation (410), the robot may resume performing additional tasks autonomously (406). Operation as described continues (406, 408, 410) until the overall assignment has been completed (412), and the process (400) ends.

Figure 5:
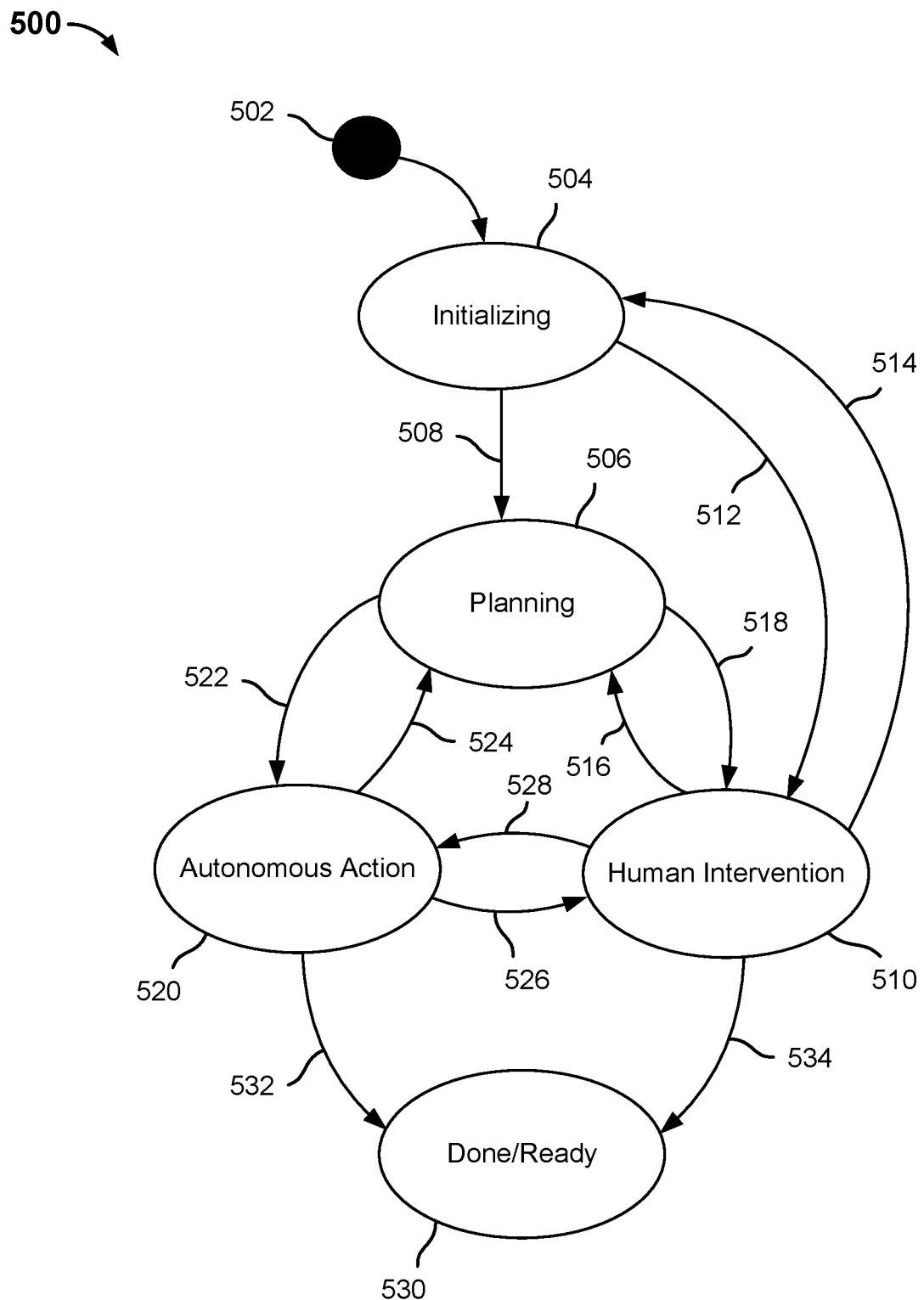
FIG. 5 is a state diagram illustrating operating states in an embodiment of an autonomous robot with on demand teleoperation.

FIG. 5 is a state diagram illustrating operating states in an embodiment of an autonomous robot with on demand teleoperation. In various embodiments, the state diagram 500 of FIG. 5 is implemented by an autonomous robot with on demand teleoperation, as disclosed herein. In the example shown, an input or other stimulus 502 causes the robot to enter an initializing state 504, in which the robot determines its starting position, orientation, and/or other state, environmental and/or other context data, etc.

If initialization is successful, the robot enters a planning state 506 via a direct transition 508. Alternatively, if the robot is not able to complete initialization, the robot may enter a human intervention state 510, via transition 512, to prompt a human user to assist in initializing the robot. If further initialization remains to be completed by the robot, the robot transitions back to the initializing state 504 via transition 514. Alternatively, the robot may transition from human intervention state 510 to planning state 506 via transition 516.

In planning state 506, the robot determines an optionally ordered set of high level actions (tasks) to be performed to achieve the overall high level assignment or objective. In the planning state 506, the robot may attempt to determine an efficient set of sub-tasks to perform in a determined order to achieve the objective efficiently, such as by minimizing arm and/or robot movement, minimizing time to completion, ensuring space efficient arrangement of items in the destination, etc. While in the planning state 506, in this example the robot may prompt a human to assist in planning, via a transition 518 to the human intervention state 510.

Upon completing planning in the planning state 506, in this example the robot enters an autonomous action state 520 via transition 522. In the autonomous action state 520, the robot acts autonomously to achieve the overall assignment and/or objective, e.g., by performing tasks and/or sub-tasks according to and/or in furtherance of the plan determined in the planning state 506. In the example shown, the robot may transition from the autonomous action state 520 back to the planning state 506. For example, if an unexpected state or context that is inconsistent with the original (or other current) plan is encountered, the robot may return to the planning state 506 to come up with another plan.

In the autonomous action state 520, the robot may invoke on demand teleoperation. For example, in some embodiments, if the robot determines it does not have a strategy available to perform a current or next task or sub-task required to be performed to continue to progress toward completion of the overall assignment or objective, the robot will transition to the human intervention state 510 via transition 526. For example, the robot may prompt a human user to intervene and perform an indicated task or sub-task, e.g., via teleoperation.

In some embodiments, upon entering the human intervention state 510 from the autonomous state 520 via transition 526, the robot waits until an input is received to resume autonomous operation. Upon receiving such an input, the robot returns to the autonomous action state 520 via transition 528. In some embodiments, while in the human intervention state 510 after a transition from the autonomous state 520 via transition 526, the robot continuously and/or periodically processes robot position, orientation, and context data to attempt to determine a strategy that would enable the robot to resume operating in the autonomous action state 520. If a strategy is timely determined, the robot may prompts a return via transition 528 to autonomous action state 520. In some embodiments, the robot transitions automatically. In some embodiments, the robot prompts the human teleoperator to stop controlling the robot by teleoperation and instead allow or actively cause the robot to return to the autonomous action state 520. In some embodiments, the degree of human intervention required to transition back to the autonomous action state 520 may be configurable and/or may vary depending on the context, the nature and use of the robot, etc.

Once the overall assignment or objective has been completed, the robot transitions to done/ready state 530, via transition 532 if the final task was performed autonomously or via transition 534 if the final task was performed via teleoperation.

Figure 6:
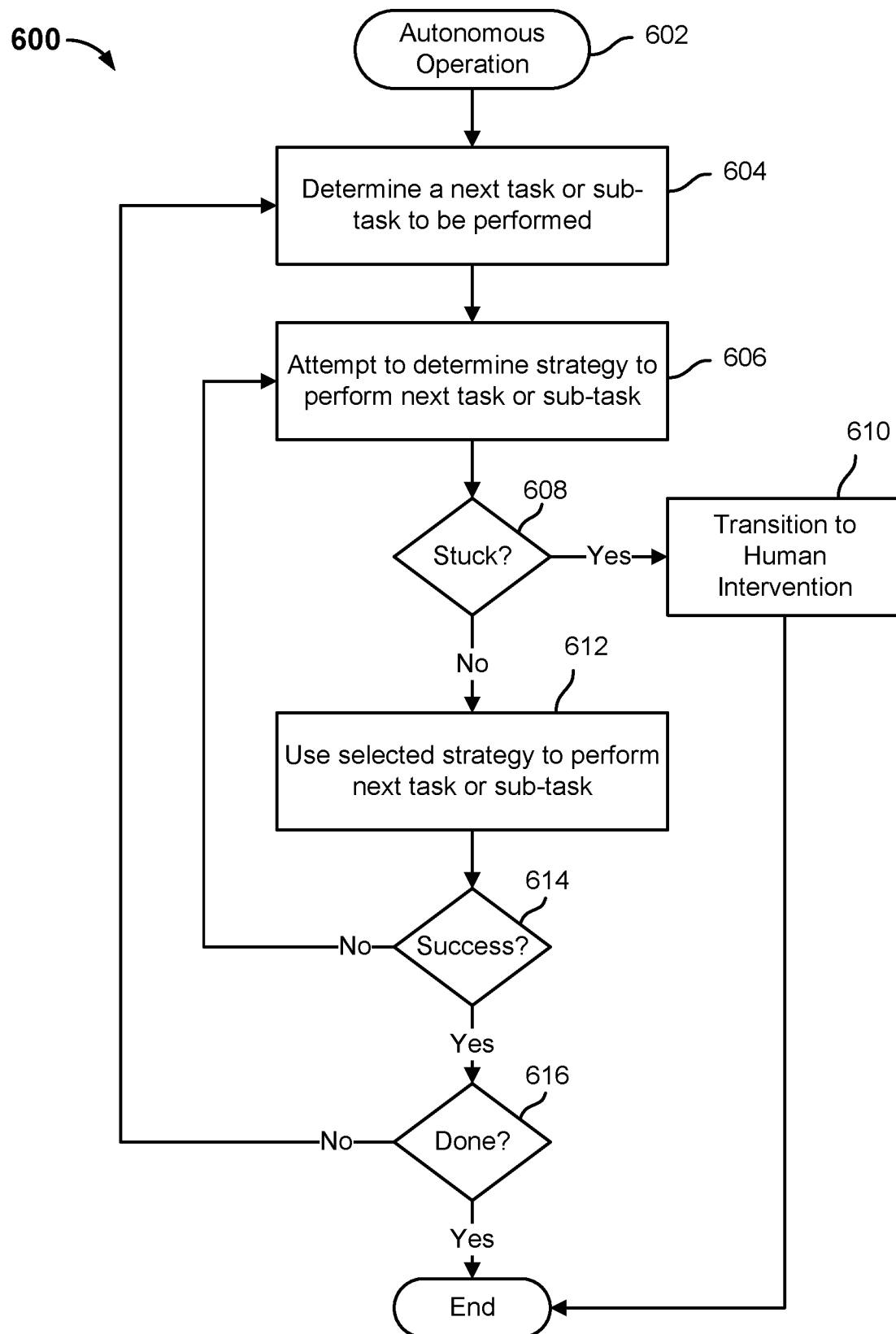
FIG. 6 is a flow chart illustrating an embodiment of process to control in an autonomous operating state an autonomous robot with on demand teleoperation.

FIG. 6 is a flow chart illustrating an embodiment of process to control in an autonomous operating state an autonomous robot with on demand teleoperation. In various embodiments, the process 600 of FIG. 6 is implemented by an autonomous robot with on demand teleoperation, such as an autonomous robot operating in the autonomous action state 520 of FIG. 5. In the example shown, upon entering the autonomous state (602), the robot determines a next task or sub-task to be performed (604). The robot attempts to determine a strategy available to the robot to perform the next task or sub-task autonomously (606). If the robot determines it has no (further) strategy to perform the next (or any next) task or sub-task (608), the robot transitions to a human intervention state (610) in which on demand teleoperation is performed. If the robot determines a strategy to proceed (606, 608), the robot uses the determined strategy to perform the next task or sub-task (612). If successful (614), the robot goes on to a next task, and so on, until done (616). If the determined strategy is attempted but does not result in successful completion of the task or sub-task (606, 608, 612, 614), the robot attempts to determine another strategy to perform the task or sub-task (606), and processing proceeds as described above unless/until the task/sub-task has been performed successfully or the robot enters the human intervention operating state.

Figure 7:
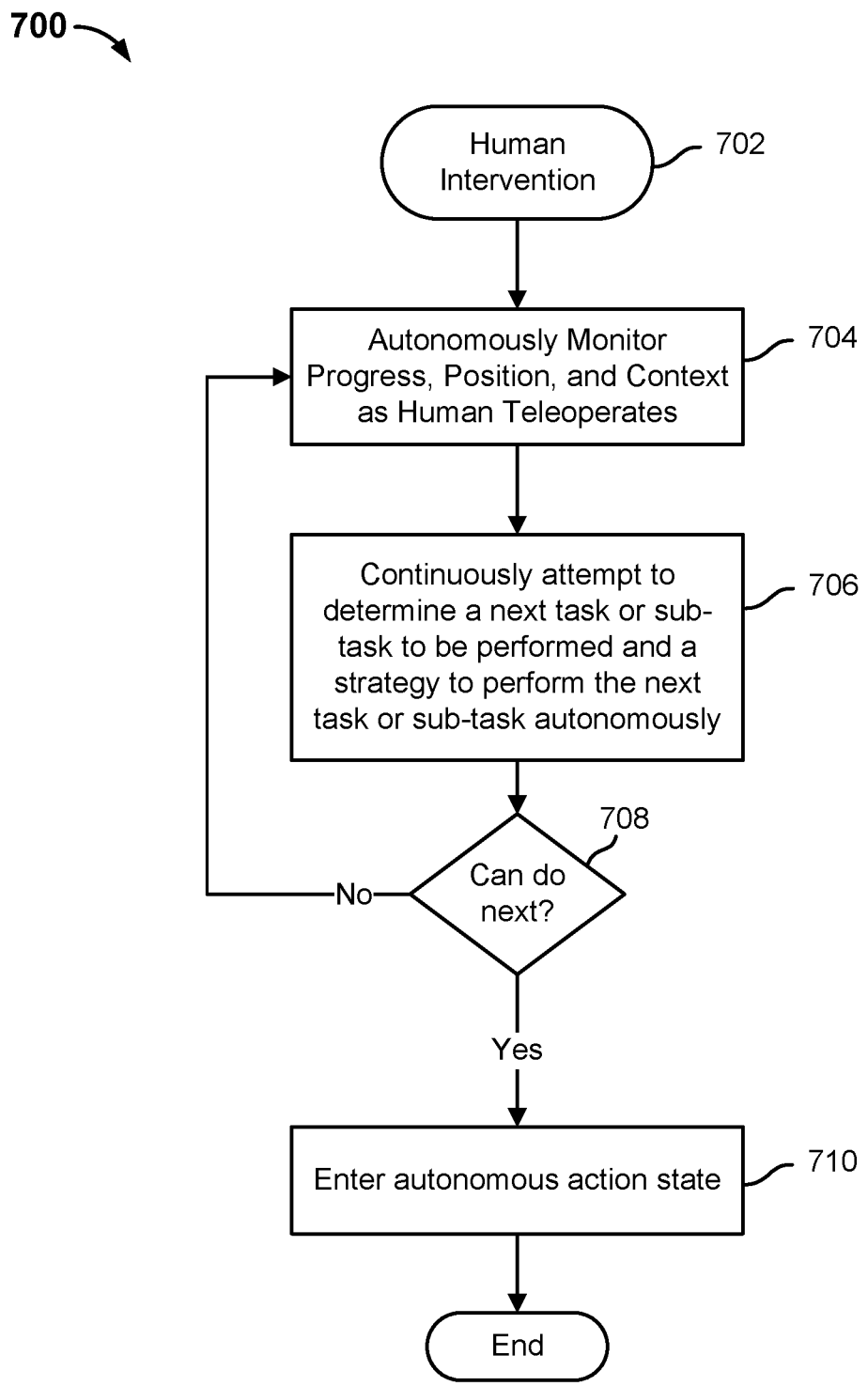
FIG. 7 is a flow chart illustrating an embodiment of process to monitor and resume autonomous control of an autonomous robot operating in a teleoperation (human intervention) state.

FIG. 7 is a flow chart illustrating an embodiment of process to monitor and resume autonomous control of an autonomous robot operating in a teleoperation (human intervention) state. In various embodiments, the process 700 of FIG. 7 is implemented by an autonomous robot with on demand teleoperation, such as an autonomous robot operating in the human intervention state 510 of FIG. 5. In the example shown, upon entering the human intervention (on demand teleoperation) state (702), the robot autonomously monitors the progress towards completion of the overall assign or operation; the position, orientation, and state of the robot; and context and/or environment data as the human operator controls the robot via teleoperation (704). The robot attempts continuously to determine a next task or sub-task to be performed and a strategy, if any, available to the robot to perform the next task or sub-task autonomously (706). If the robot determines a task or sub-task to be done for which the robot has a strategy to complete the task or sub-task (708), the robot enters the autonomous action state (710). In some embodiments, the robot may enter the autonomous action state automatically. In some embodiments, the robot may enter the autonomous action state by prompting the human user to allow or initiate a transition to the autonomous action state.

In various embodiments, techniques disclosed herein may facilitate monitoring and on demand teleoperation of a plurality of robots, e.g., each at a different location, by a same human operator or collocated team of operators.

Figure 8:
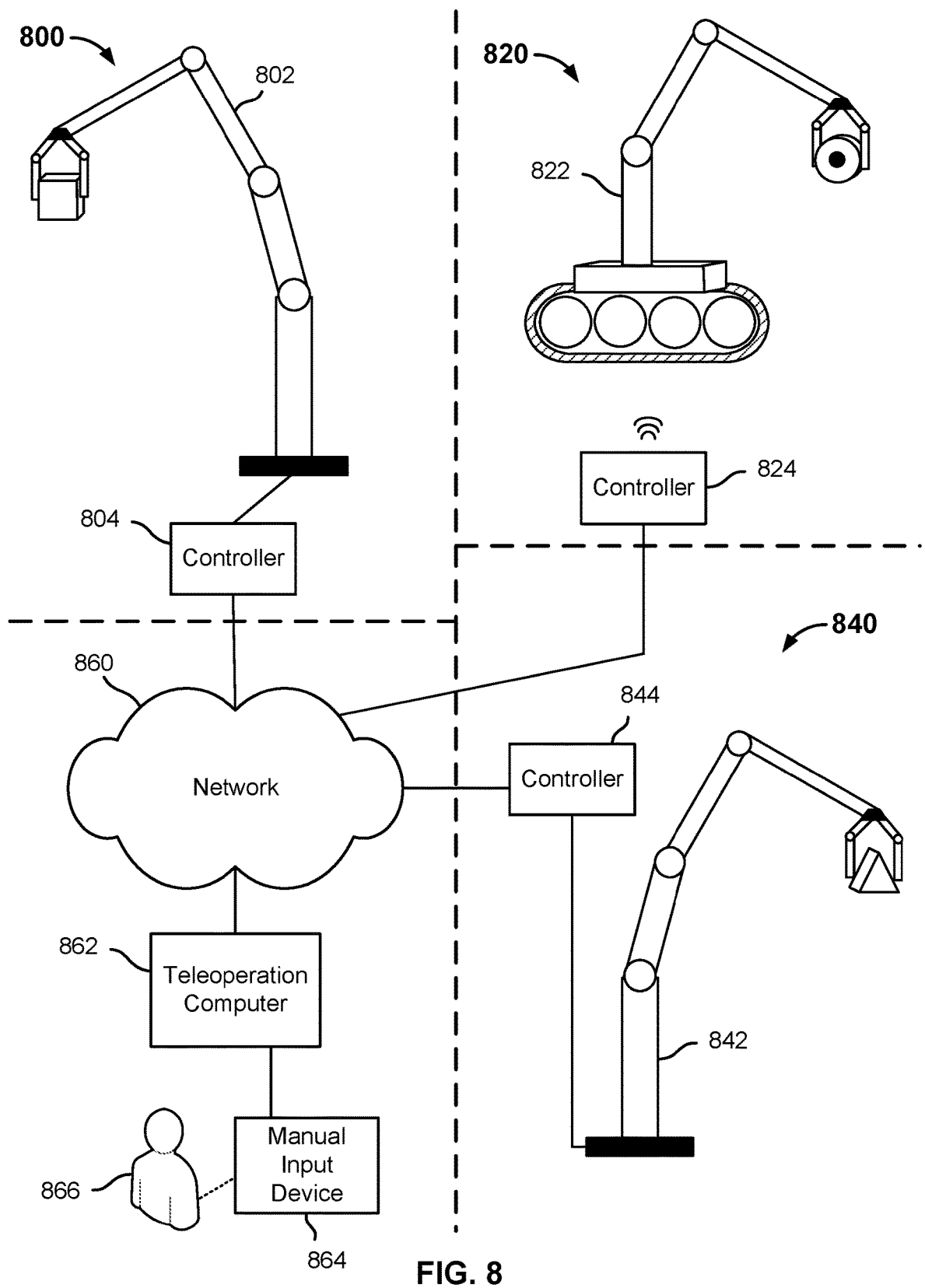
FIG. 8 is a block diagram illustrating an embodiment of a system to provide one-to-many control of a plurality of autonomous robots with on demand teleoperation.

FIG. 8 is a block diagram illustrating an embodiment of a system to provide one-to-many control of a plurality of autonomous robots with on demand teleoperation. In the example shown, a controller 804 associated with a robot 802 operating in a first location 800; a controller 824 associated with a robot 822 operating in a second location 820; and a controller 844 associated with a robot 842 operating in a third location 840 each is connected via network 860 to a teleoperation computer 862 at a fourth location. The teleoperation computer 862 is configured to control at any given time any one of the robots 802, 822, and 842, based on teleoperation inputs provided via a manual input device 864 by a human operator 866. In various embodiments, the teleoperation computer 862 is configured to receive via network 860 from one or more of controllers 804, 824, and 844 an indication that a robot controlled by that controller requires on demand human intervention (teleoperation). In response, the teleoperation computer 862 displays to user 866 information about the affected robot and its current position, state, context, environment, etc., and the task to be performed. The teleoperation computer 862 uses a model for the affected robot to map inputs provided via the manual input device 864 to corresponding control signals, commands, instructions, etc. to control operation of the affected robot. Once teleoperation of the affected robot is completed, the teleoperation computer re-enters a monitoring state in which it waits for a next indication to perform teleoperation is received.

While in the example shown in FIG. 8 one human teleoperator controls many different robots via teleoperation, each operating in a separate, one robot environment, in some embodiments a single human teleoperator may control multiple robots in the same environment at one time. For example, a task may require two or three robots to work together to pick up objects. Or, a task may require three robots to work together to sort objects in a single pile of objects. In some embodiments, multiple robots are tasked to work autonomously in the same space on a shared task, such as by pointing each at the same target (e.g., pile of objects)

and destination (e.g., object-specific bins). The robots each work autonomously (or in concert) to perform the assigned tasks. If any (or all) gets stuck, human intervention is requested.

Figure 9:
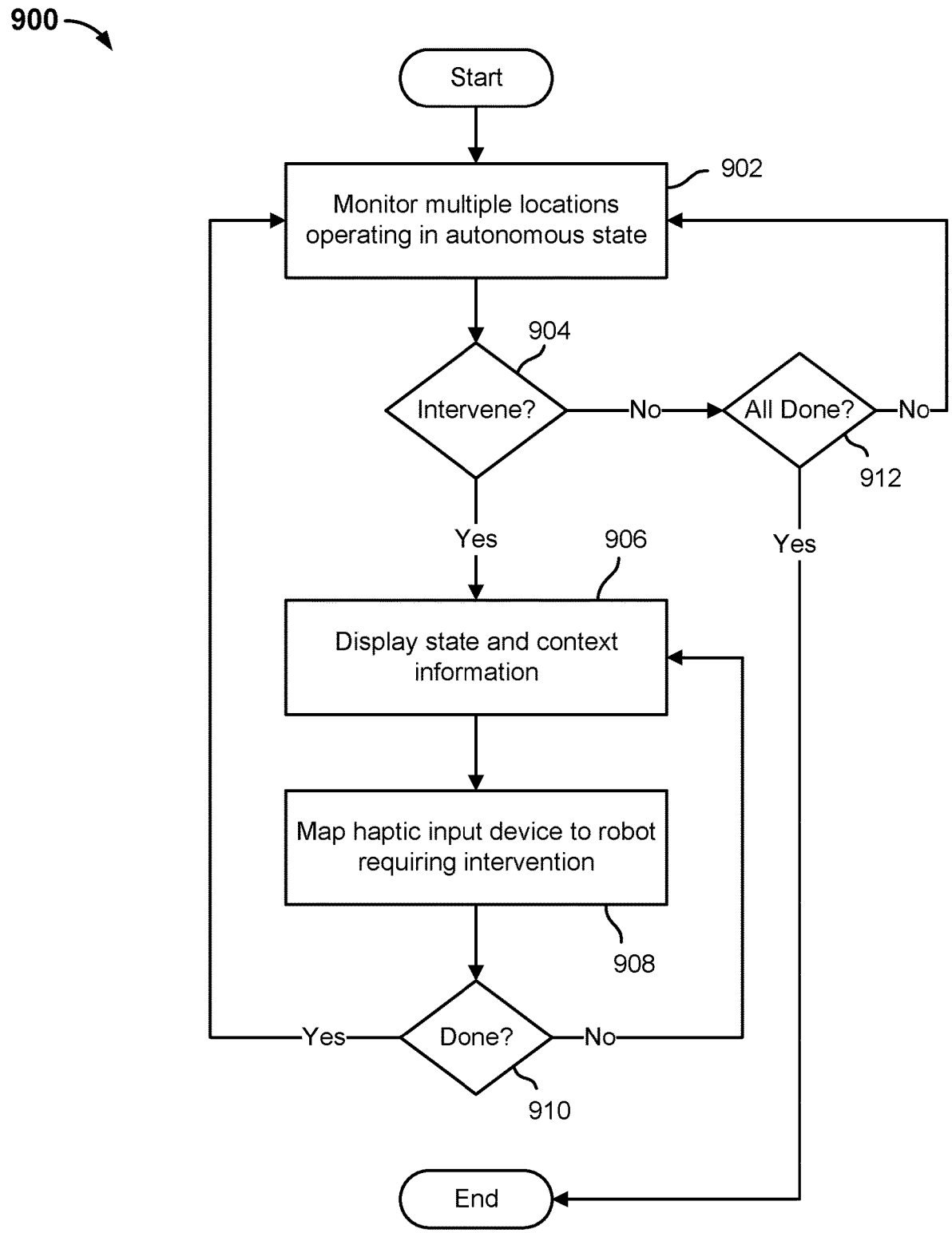
FIG. 9 is a flow chart illustrating an embodiment of process to provide one-to-many control of a plurality of autonomous robots with on demand teleoperation.

FIG. 9 is a flow chart illustrating an embodiment of process to provide one-to-many control of a plurality of autonomous robots with on demand teleoperation. In various embodiments, the process 900 of FIG. 9 is performed by a computer, such as teleoperation computer 862 of FIG. 8. In the example shown, robots at multiple locations each operating in an autonomous state are monitored (902). Video or other feeds may be provided, e.g., via a display device. If an indication to provide human intervention (e.g., teleoperation) is received with respect to a given robot and/or location (904), then robot state and context information is displayed to a human user (906) and inputs provided via a haptic or other manual input device are mapped to corresponding control inputs for the robot to be controlled via teleoperation (908). Once the human intervention (teleoperation) is completed (910), the affected robot resumes autonomous operation and the system implementing the process 900 resumes monitoring the multiple locations (902). Monitoring and human intervention (as/if needed) continue as described until all robots have completed or otherwise ended their work (912), upon which the process 900 ends.

In some embodiments, an autonomous robot as disclosed herein attempts to anticipate and preempt situations in which the robot may become stuck and required to request and wait for human assistance to be provided, e.g., via teleoperation. In some embodiments, a robot as disclosed herein attempts to obtain human assistance in advance (e.g., tell me how to pick up an item like item C) and/or to schedule in advance human assistance to be provided at a time when it is expected to be needed.

Figure 10:
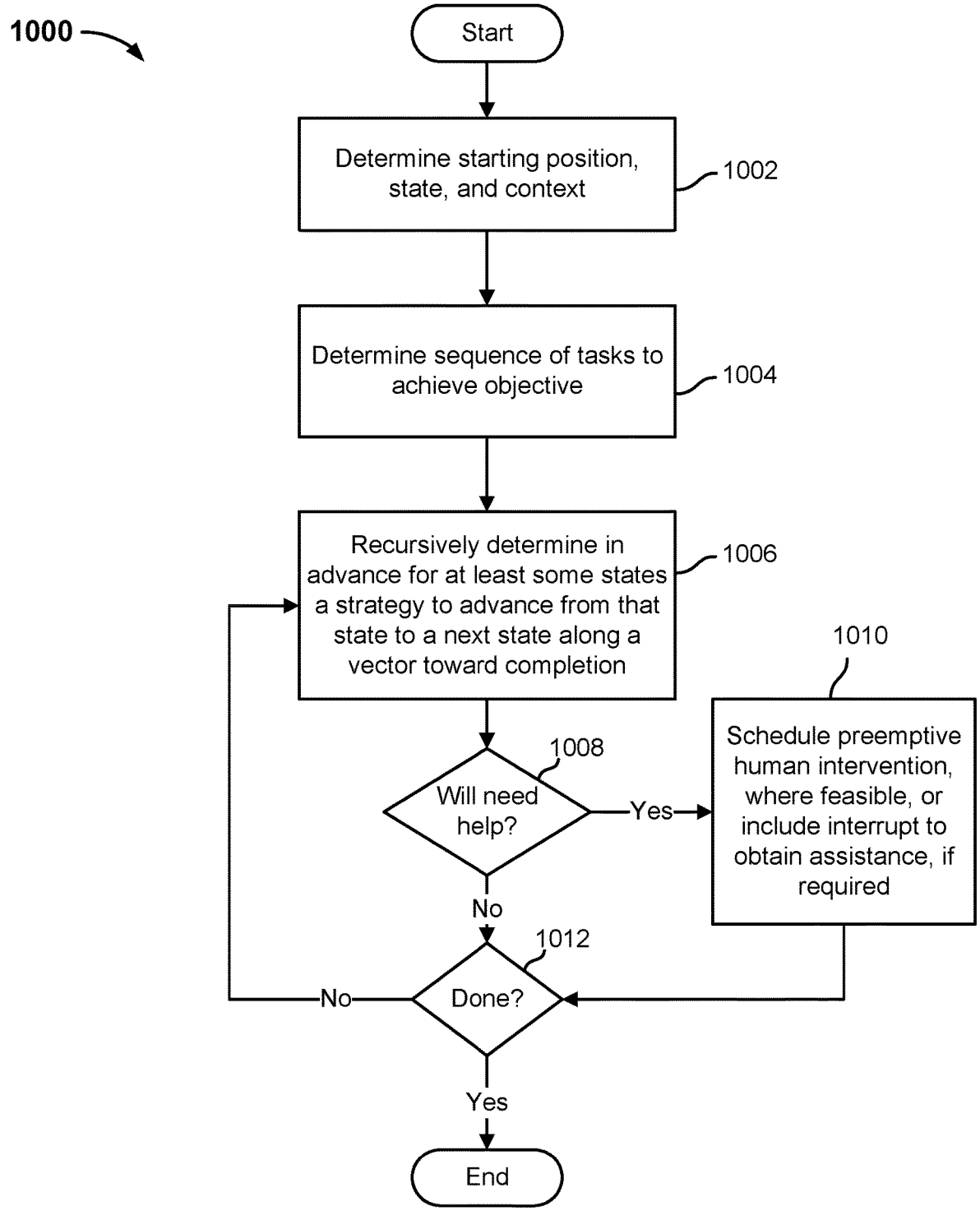
FIG. 10 is a flow chart illustrating an embodiment of a process to obtain human assistance preemptively.

FIG. 10 is a flow chart illustrating an embodiment of a process to obtain human assistance preemptively. In various embodiments, an autonomous robot as disclosed herein implements the process of FIG. 10, at least with respect to situations the robot is able to anticipate. In some embodiments, all or part of the process 1000 of FIG. 10 may be performed during the planning state 506 of the example shown in FIG. 5. In the example shown, upon receiving an assignment the robot determines its starting position, state, and context (1002). The robot determines a sequence of tasks to achieve the objective (i.e., complete the assignment) (1004), the sequence of tasks implying and/or otherwise having associated therewith a set of states from the starting state to a completion state in which the assignment has been completed. The robot determines recursively in advance for at least a subset of tasks and/or associated states a strategy to advance from that state to a next state along a vector toward completion of the assignment (1006). For any future task/state for which the robot determines it will require human intervention (e.g., teleoperation, identification of an object, selection of an existing strategy, teaching the robot a new strategy, etc.) (1008), the robot to the extent possible requests and obtains human help in advance (1010), including by scheduling human teleoperation and a scheduled interrupt of its own autonomous operation to obtain human assistance before resuming autonomous operation. The robot operates autonomously, as able, and obtains scheduled and/or on demand (e.g., for unanticipated events that cause the robot to become stuck) human assistance, as required, until the assignment is completed (1012).

In various embodiments, techniques disclosed herein may enable more complicated tasks requiring higher degrees of dexterity to be performed autonomously, in some embodiments concurrently at a plurality of remote locations, with human intervention being provided on demand, as, if, and when needed, to ensure all operations are performed to completion.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
operate a robot in an autonomous mode of operation in which the robot performs one or more tasks autonomously without human intervention;
determine that a first strategy is not available to perform a next task autonomously; and
in response to the determination that the first strategy is not available, enter a human intervention mode of operation, wherein in the human intervention mode of operation, the processor is configured to:
monitor teleoperation of the robot and progress toward completion of a high level operation associated with the robot;
determine a second strategy to perform a determined task associated with completion of the high level operation based on the monitoring; and
in response to the determination of the second strategy to perform the determined task, resume the autonomous mode of operation by performing the determined task; and
a communication interface coupled to the processor and configured to communicate control values to one or more actuators of the robot.

2. The system of claim 1, wherein the processor is included in the robot.

3. The system of claim 1, wherein to operate the robot in the autonomous mode of operation, the communication interface receives the high level operation to be performed by the robot.

4. The system of claim 3, wherein the high level operation is received via a user interface.

5. The system of claim 3, wherein the high level operation identifies one or more items to be manipulated by the robot and for each of the items one or both of a source location to obtain the item and a destination location at which to place the item.

6. The system of claim 3, wherein to operate the robot in the autonomous mode of operation, the processor is configured to initialize the system to perform the high level operation.

7. The system of claim 6, wherein to initialize, the processor is configured to determine one or more of robot location, robot position, robot state, robot context, and robot environment.

8. The system of claim 3, wherein to operate the robot in the autonomous mode of operation, the processor is configured to determine without human intervention a plan to perform the high level operation.

9. The system of claim 8, wherein the plan includes a set of tasks to be performed to complete the operation, and the set of tasks includes the one or more tasks.

10. The system of claim 9, wherein the set of tasks comprises an at least partly ordered set of tasks.

11. The system of claim 9, wherein to operate the robot in the autonomous mode of operation, the processor is configured to recursively perform for each task to be performed and as applicable each component subtask thereof a corresponding strategy to perform the task or subtask.

12. The system of claim 11, wherein the corresponding strategy is associated with one or more skills of the robot to be applied to perform the task or subtask.

13. The system of claim 1, wherein to enter the human intervention mode the processor causes a human operator to commence teleoperation.

14. The system of claim 1, wherein the robot comprises a first robot included in a plurality of robots, each at an associated location and each having a corresponding processor; and wherein the system further comprises an interface to enable teleoperation of a currently selected one of the robots.

15. The system of claim 14, wherein two or more robots included in a plurality of robots are located in a same associated location.

16. The system of claim 1, wherein the processor is further configured to monitor position of the robot, orientation of the robot, state of the robot, context, and/or environment data while the robot is in the human intervention mode.

17. A method, comprising:
operating a robot in an autonomous mode of operation in which the robot performs one or more tasks autonomously without human intervention;
determining by a processor comprising or otherwise associated with the robot that a first strategy is not available to perform a next task autonomously; and
in response to the determination that the first strategy is not available, the processor causing a human intervention mode of operation to be entered, wherein in the human intervention mode of operation, the processor:
monitoring teleoperation of the robot and progress toward completion of a high level operation associated with the robot;
determine a second strategy to perform a determined task associated with completion of the high level operation based on the monitoring; and
in response to a determination of the second strategy to perform the determined task, resuming the autonomous mode of operation by performing the determined task.

18. The method of claim 17, further comprising the processor providing sensor output data to assist a human operator in performing human intervention in said human intervention mode of operation.

19. A computer program product embodied in a non-transitory computer readable medium and comprising computer instructions for:
operating a robot in an autonomous mode of operation in which the robot performs one or more tasks autonomously without human intervention;
determining that a first strategy is not available to perform a next task autonomously; and
in response to the determination that the first strategy is not available, entering a human intervention mode of operation, wherein in the human intervention mode of operation including instructions for:
monitoring teleoperation of the robot and progress toward completion of a high level operation associated with the robot;
determining a second strategy to perform a determined task associated with completion of the high level operation based on the monitoring; and
in response to determining the second strategy to perform the determined task, resuming the autonomous mode of operation by performing the determined task.

* * * * *